J. P. MINGLE AND A. G. WILSON.
APPARATUS FOR TRANSFERRING GLASS ARTICLES TO ANNEALING FURNACES.
APPLICATION FILED DEC. 4, 1918.
1,321,072.
Patented Nov. 4, 1919.
2 SHEETS—SHEET 1.
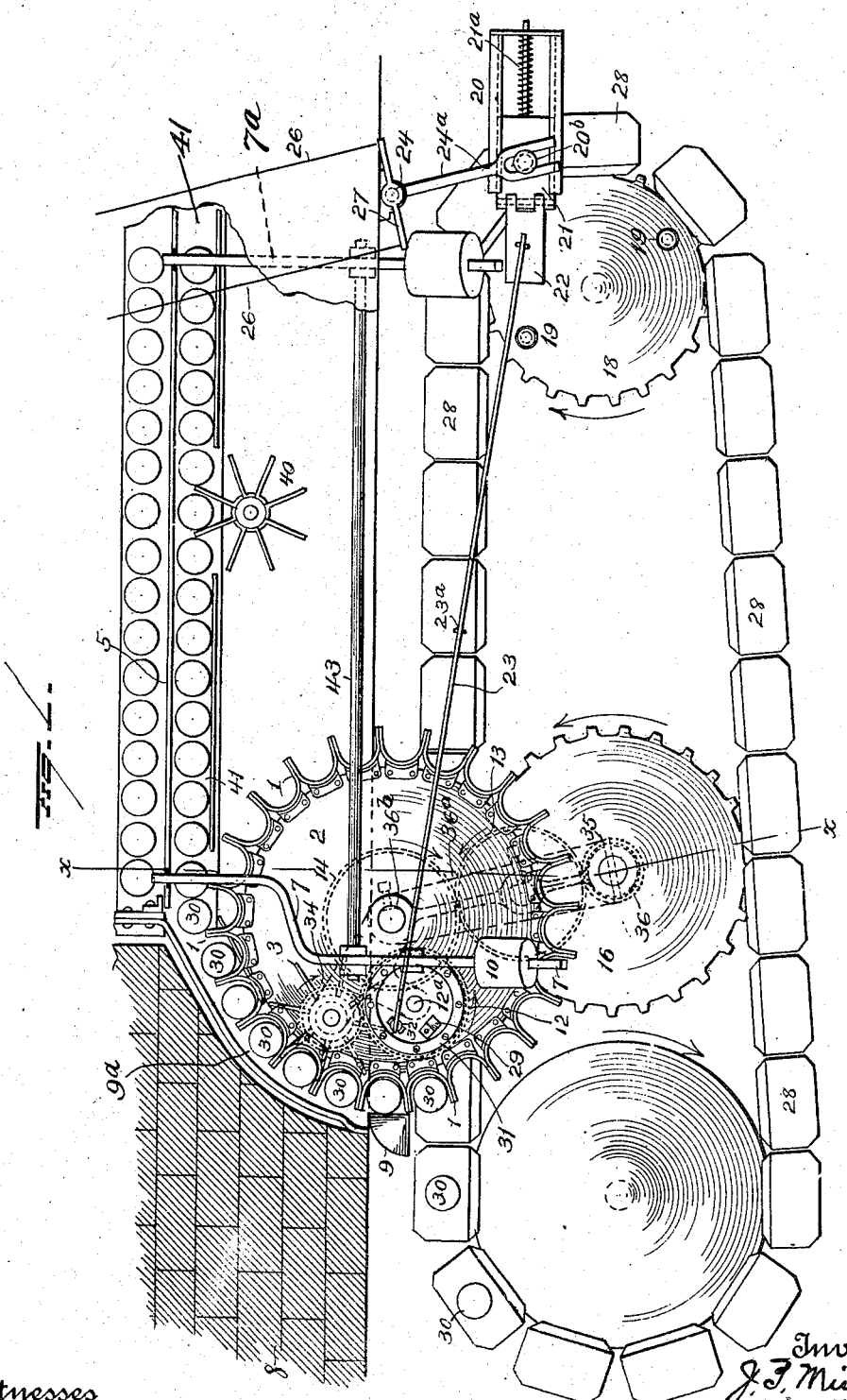

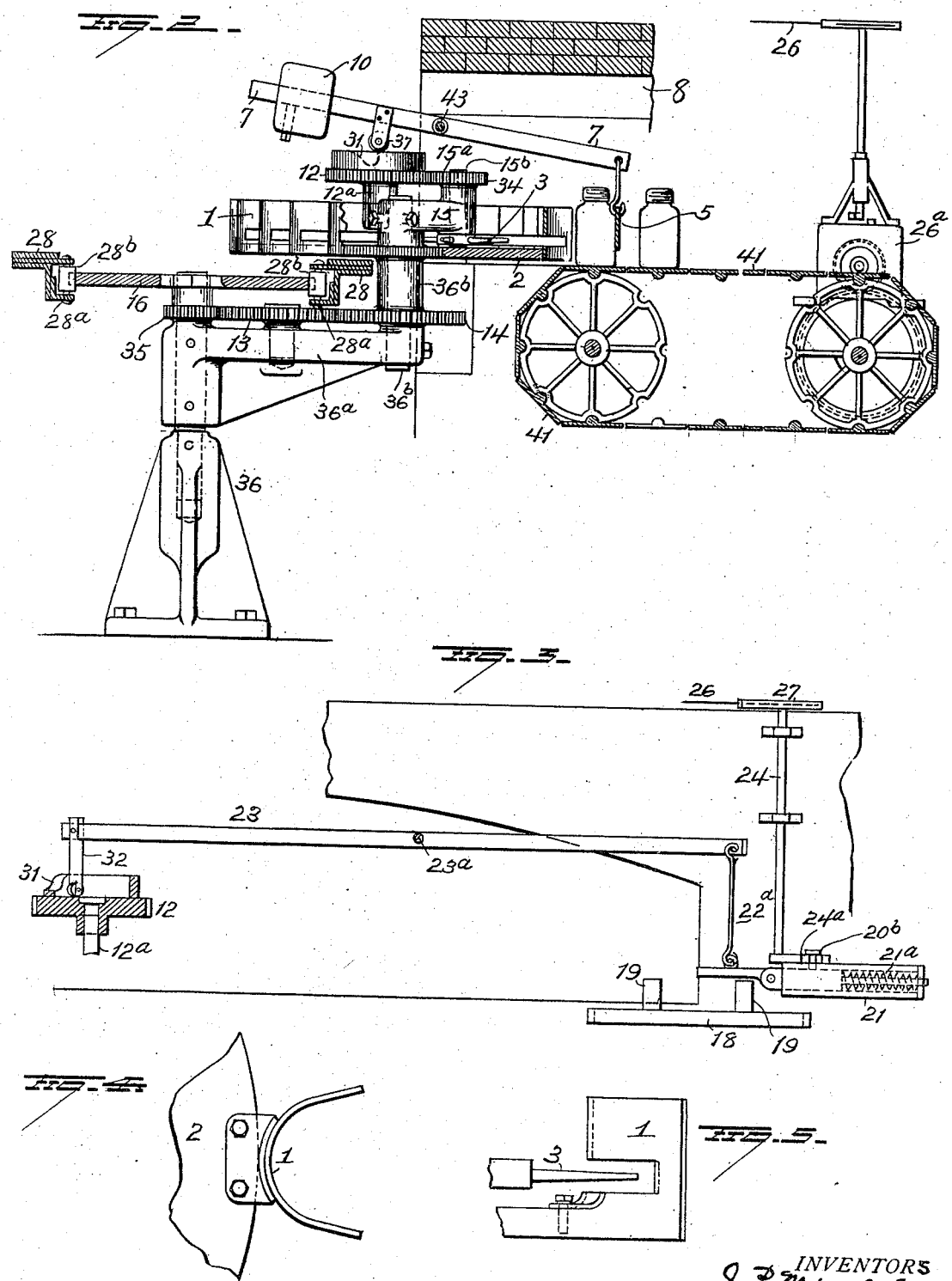

UNITED STATES PATENT OFFICE.

JOSEPH P. MINGLE AND ANONA G. WILSON, OF MUNCIE, INDIANA.

APPARATUS FOR TRANSFERRING GLASS ARTICLES TO ANNEALING-FURNACES.

1,321,072. Specification of Letters Patent. Patented Nov. 4, 1919.

Application filed December 4, 1918. Serial No. 265,290.

*To all whom it may concern:*

Be it known that we, JOSEPH P. MINGLE and ANONA G. WILSON, citizens of the United States, and residents of Muncie, in the county of Delaware and State of Indiana, have invented certain new and useful Improvements in Apparatus for Transferring Glass Articles to Annealing-Furnaces; and we do hereby declare the following to be a full, clear, and exact description of the invention, such as will enable others skilled in the art to which it appertains to make and use the same.

Our invention relates to an improvement in apparatus for transferring glass articles from an endless conveyer into an annealing leer, the object being to provide means for feeding articles to the leer pans of the annealing furnace and for automatically advancing the pans into the furnace as they are filled, and it consists in the parts and combination of parts and in the details of construction as will be more fully explained and pointed out in the claims.

In the accompanying drawings; Figure 1 is a view in plan of the improved apparatus part of the conveyer being broken away; Fig. 2 is a view in vertical section on the line $x\ x$ of Fig. 1; Fig. 3 is a view in side elevation of the trip mechanism for actuating the motor controlling the feeding movement of the leer pans; Fig. 4 is a view in plan of one of the pockets and Fig. 5 is a view in side elevation of the same and also showing a part of the star wheel.

The apparatus may be used for feeding jars, bottles, glasses and other articles to a leer, but for the purpose of convenience we will hereinafter refer to jars only, it being understood that the term is to include any and all wares that may be handled by the apparatus.

28 represents a conveyer consisting of a series of horizontal trays on which the jars are placed in upright position, and an endless chain 28ª connecting and carrying the trays, the chain being provided with vertically disposed anti-friction rollers 28ᵇ which engage the sprocket teeth of wheel 16 and rotate the same. Motion is imparted to conveyer 28, by any suitable motor and the conveyer in turn transmits motion to sprocket wheel 16. This sprocket wheel 16 is mounted on an upright bearing carried by the pedestal 36, and is integral with or rigidly connected to the small gear wheel 35, which is in mesh with the larger gear wheel 13 journaled on a stud carried by the bracket 36ª. This bracket is secured on the bearing carrying wheel 16, and carries at its outer or free end the stud 36ᵇ on which gear wheel 14 is mounted to rotate. Gear wheel 14 is in mesh with gear wheel 13, and carries the table 2 to which rotation is imparted from gear wheel 35 through gears 13 and 14. The rotating table 2 is in a plane slightly above the conveyer 28, as shown in Fig. 2, and as before explained is driven indirectly by it, so that the movements of the table and conveyer are in unison.

Table 2 is provided at its periphery with a series of approximately semi-cylindrical pockets 1 which are disposed vertically and are designed to receive the jars 30 from the conveyer 28 and transfer them onto the leer pans 41. The table 2 and conveyer 28 are so constructed and timed in their movements, that each pocket 1 is in proper position to receive a jar from a tray of the conveyer 28, and move it clockwise toward and into the inlet end of the leer 8.

Located at the point where the jars leave the conveyer 28 is the cam block 9 which is designed to restore the jar to an upright position in the event it has fallen over, or, if it has been misplaced on the conveyers, or contacts with a pocket in such a manner as to upset it, the movements of the conveyer 28 together with the movements of the pockets 1, will carry the jar over and up the incline 9 and deposit it in upright position in a pocket.

After the jars enter the pockets they pass over onto the horizontal shelf 9ª within the leer at the front end thereof, and are moved over the latter to a pan 41. The leer is provided with what is known as a continuous pan-chain on which the ware is deposited and which is moved with an intermittent movement through the leer. The jars are fed by the pockets on the table, onto a leer-pan crosswise the leer and after the pan has been filled or a predetermined number of jars placed thereon, it is moved in a direction to carry the filled pan into the leer and present an empty pan for filling.

Secured to the stud 36ᵇ on bracket arm 36ª, and above table 2 is the frame 15, which is rigidly secured to the said stud by set screws 15ª, and secured to the lower end of shaft 15$^b$ mounted in the said frame, is the star wheel 3 the latter being below the frame 15. The fingers of this star wheel are of a length sufficient to enter between the jars in the pockets 1 as shown in Fig. 1, and the parts are so proportioned that one finger of the wheel will enter between each two jars as the latter move over the shelf 9$^a$, thus imparting a rotary motion to the wheel 3, the pockets being slotted as shown in Fig. 5 to permit of such movement.

Secured to the shaft 15$^b$ above the frame is the gear wheel 34 which meshes with gear wheel 12 mounted to rotate on the stud 12$^a$ secured to frame 15. The gear wheel 12 is provided on its upper face with a cam 31 on which the roller 37 carried by the lever 7 rests. This lever is secured to a shaft 43 at one end thereof, and a similar lever 7$^a$ is secured to the said shaft near its opposite end. Both levers 7 and 7$^a$ are weighted at their outer end, so that when the roller 37 on lever 7 falls into the cam slot (shown in dotted lines) in the cam 31, the weights 10 depress the said levers at their outer ends and raise them at their inner end and thus elevate the guard 5 suspended from the inner ends of said levers. The guard 5 normally rests at the rear of the pan 41 being filled, and when the said pan is filled this guard will be elevated by the cam as above explained, so as to permit the filled pan to be moved rearwardly into the annealing chamber of the leer and an empty pan brought into position for filling. After the pan of jars has been shifted, the continued rotation of the cam 31 lifts the roller 37 and the outer end of lever 7, thus causing the guard to descend into position to act as a back stop and guide for the jars being loaded onto the next pan of the series.

As the star wheel is rotated or actuated by contact with the jars carried in the pockets, it will be seen that should there be no jars in one or more of the pockets, the star wheel will remain idle until engaged by a jar carried by the continuously rotating table, and as the mechanism for moving the pan chain leer is under the control of the star wheel and is actuated by the movements of the latter, the leer pan will not be shifted until the one being loaded has been filled, or a predetermined number of jars deposited in the same. The object therefore of the star wheel is to count the jars passing into the leer, so that by employing different sizes of star wheels 31 and cams 34, the number of jars or other pieces passing to each pan of the leer can be regulated and controlled.

Secured to the upper face of wheel 12 is the trip member 29 which is engaged by the roller on the lower end of arm 32 secured to lever 23. This lever is pivoted at the point 23$^a$ and is connected by link 22$^a$ to the latch 22. This latch is hinged to the block 21 mounted to slide in the guide way 20, and is adapted to be moved by the trip member 29 and lever 23 to bring its free end in the path of movement of a lug or lugs 19 secured to the upper face of sprocket wheel 18, which supports and is engaged by the endless conveyer chain 28, and necessarily rotates when the said chain is in motion. During the clockwise movement of sprocket wheel 18, the pins 19 either engage the free end of latch, or pass under the same. The wheel 12 carrying the trip member is actuated by the star wheel 3, consequently is rotating only when jars are being fed to the leer. This star wheel and wheel 12 are so proportioned to feed a predetermined number of jars at each revolution to each leer pan, hence once at each revolution of wheel 12, the trip member 29 will move into position to engage the arm 32 and elevate the end of the lever 23 carrying said arm. This elevation of the inner end of lever 23, lowers its outer end and consequently lowers the free end of the latch member, into the path of movement of a lug 19 on sprocket wheel 18. As the lug engages the free end of the latch it pushes it and the block 21 to which it is hinged, forwardly against the tension of spring 21$^a$ which latter restores the parts to their normal position as soon as the lug is disengaged from the latch 22. As the latch moves forwardly, the link suspending the same is also swung forwardly thus operating to elevate the free end of the latch, until the latter is raised to a plane above the lug thus permitting the latter to pass under the latch. As soon as the pressure of the lug on the end of the latch is withdrawn, the spring 21$^a$, or a counterweight or any equivalent device operates to restore the latch to the normal position to be again engaged by the lug.

This back and forth movement of the sliding block 21 operates through the bifurcated crank 24$^a$, shaft 24, cross-head 27 and the wires 26 to shift a clutch or start and stop the motor 26$^a$ which actuates the leer pans. The trip member is designed to engage the arm on lever 23 when a leer pan has been filled or a predetermined number of jars deposited thereon, so that when the required number of jars have been fed onto a pan, the trip member 29 engages the end of lever 23 and operates same to move the free end of the latch into the path of movement of the lug. The rearward movement of the sliding block 21 turns the crank 24$^a$ which as shown is bifurcated and straddles the lug 20$^b$ on the sliding block, and this movement of the crank imparts a partial rotation to the shaft 24. The cross head 27 on the shaft at the upper end of the latter is connected by wires 26 with a motor 26$^a$ which drives the leer pans so that when the said shaft 24 is rotated in one direction it starts the motor which drives the leer pans, and the reverse rotation of the shaft 24 by the spring 21ª or its equivalent, stops the motor.

40 represents a star wheel located in a position to be engaged and rotated by the moving jars on the pan being filled. This star wheel operates to separate the jars and turn or rotate them more or less and thus prevent them from sticking.

With this construction the endless conveyer 28 may operate continuously while the movement of the star wheel 3 and the parts actuated thereby is controlled by the progressive movement of the jars in their passage from the conveyer to the leer, hence the leer pans on which the jars are deposited will not be advanced a step in its progressive movement until it has been loaded, or until a predetermined number of jars has been deposited thereon. When the pan has been loaded, the guard rail 5 at the rear of the pan will be elevated, and the filled pan moved inwardly one step thus bringing an empty pan into position for loading. The guard rail is then lowered and thus remains so until cam 31 has made another revolution.

It is evident that many slight changes might be resorted to in the relative arrangement of parts shown and described without departing from the spirit and scope of our invention. Hence we would have it understood that we do not wish to confine ourselves to the exact construction and arrangement of parts shown and described, but Having fully described our invention what we claim as new and desire to secure by Letters-Patent, is:—

1. In an apparatus of the character described, the combination of an endless conveyer, a leer composed of a series of connected pans, a revolving table located at the front end of the leer and adjacent one end of the leer pans, and provided with pockets for receiving the jars and for transferring them to the leer pans endwise the latter, a movable guard rail at the rear of the pan being loaded, a rotating device actuated by contact with the jars being transferred from the conveyer to the leer pans for elevating the guard rail and means also actuated by the said contact means for controlling the movement of the leer pans.

2. In an apparatus of the character described, the combination of an endless conveyer, a revolving table having pockets to receive the jars and transfer them from said endless conveyer to the leer, a star wheel actuated by contact with the moving jars after they have left the endless conveyer, movable leer pans within the leer and means actuated by said star wheel for intermittingly imparting a progressive movement to said leer pans, whereby a loaded pan will be moved into the leer and an empty pan moved to position to receive the incoming jars.

3. In an apparatus of the character described, the combination of an endless conveyer, a revolving table having synchronized movement with the conveyer, the said table having pockets for receiving the jars and for transferring them from the endless conveyer to the leer pans, a star wheel rotated by contact with the jars in said pockets, movable leer pans within the leer and means actuated by the said star wheel for imparting an intermittent progressive movement to said leer pans, whereby a loaded pan will be moved into the leer and an empty pan moved to position to receive the incoming jars.

4. In an apparatus of the character described, the combination of an endless conveyer, a revolving table having synchronized movement with the said conveyer and provided at its periphery with pockets for receiving the jars from the conveyer and transferring them to the leer pans, a star wheel rotated by contact with the jars in said pocket, movable leer pans, a movable guard for directing the movement of the jars into the leer pan being loaded, means actuated by the said star wheel for lifting the said guard above the jars and means also actuated by said star wheel for imparting an intermittent progressive movement to the leer pans.

5. In an apparatus of the character described, the combination of an endless conveyer, a revolving table, gearing connecting the conveyer and table whereby they are moved in unison, the said table having pockets to receive the jars from the endless conveyer and transfer them to the leer, a star wheel the points of which engage the jars within the pockets of the table and rotated by the progressive movement of the jars, a wheel actuated by the said star wheel and carrying a tripping device, movable leer pans and means actuated by the tripping device for imparting an intermittent progressive movement to the said leer pans.

6. In an apparatus of the character described, the combination of an endless conveyer, a revolving table, gearing connecting the conveyer and table, the latter having peripheral pockets to receive the jars from the endless conveyer and transfer them to the leer, a star wheel the points of which engage the jars in the pockets and are moved thereby, a wheel actuated by said star wheel, movable leer pans, a guard for directing the jars onto the pan being loaded, a cam on said wheel, means actuated by the cam for lifting the guard out of the plane of the jars and means also actuated by the said wheel for imparting an intermittent progressive movement to the leer pans.

7. In an apparatus of the character described, the combination of a series of movable leer pans, means for feeding jars to the pan being loaded, a movable guard at the rear of the pan being loaded for guiding the jars into position on the pan, a device rotated by contact with the moving jars, and means actuated by said rotating device for lifting the guard when the leer pan has been loaded.

8. In an apparatus of the character described, the combination of a series of movable pans, means for feeding jars to the pans, driving means for the leer pans, a rotating device actuated by contact with the jars as they are fed to the leer pan and means actuated by said rotating device for controlling the leer pan driving means.

9. In an apparatus of the character described, the combination of a series of movable leer pans, means for feeding jars onto the pan being loaded, a guard for guiding the jars as they are moved onto the pan lengthwise the latter, a rotating device actuated by contact with the moving jars, means actuated by said rotating device for controlling the leer pan starting means and means also actuated by said rotating device for lifting the guard just prior to the inward movement of the filled leer pan.

10. In an apparatus of the character described, the combination of a series of movable leer pans, means for feeding the jars onto said pans, means actuated by the progressive movement of the jars for starting the leer pans driving means, and means engaging the jars on the leer pan for separating the jars to prevent them from sticking together.

11. In an apparatus of the character described, the combination of means for moving a series of jars in succession, a star wheel engaged by the moving jars and rotated thereby, a rotating wheel having a lug projecting therefrom, a latch adapted to be set to be engaged by said lug, a wheel actuated by the star wheel and having a tripping device thereon, lever mechanism actuated by said tripping device and connected with the latch for setting the latter in position to be engaged by the lug on the rotating wheel, leer pans adapted to have an intermittent progressive movement and means connecting the latch and driving mechanism of the leer pans whereby the movements of the latter are controlled by the rotation of the star wheel.

In testimony whereof, we have signed this specification in the presence of two subscribing witnesses.

JOSEPH P. MINGLE.
ANONA G. WILSON.

Witnesses:
WILLIAM A. McCLELLAN,
HARRY LONG.